United States Patent
Werdecker et al.

(10) Patent No.: US 12,473,979 B2
(45) Date of Patent: Nov. 18, 2025

(54) MECHANICAL SEAL ARRANGEMENT

(71) Applicant: EagleBurgmann Germany GmbH & Co. KG, Wolfratshausen (DE)

(72) Inventors: Ferdinand Werdecker, Walchensee (DE); Andreas Fesl, Otterfing (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 18/730,853

(22) PCT Filed: Jan. 17, 2023

(86) PCT No.: PCT/EP2023/050927
§ 371 (c)(1),
(2) Date: Jul. 22, 2024

(87) PCT Pub. No.: WO2023/147991
PCT Pub. Date: Aug. 10, 2023

(65) Prior Publication Data
US 2025/0092952 A1    Mar. 20, 2025

(30) Foreign Application Priority Data
Feb. 7, 2022 (DE) .............. 10 2022 102 776.7

(51) Int. Cl.
*F16J 15/34* (2006.01)
(52) U.S. Cl.
CPC ........ *F16J 15/3484* (2013.01); *F16J 15/3412* (2013.01); *F16J 15/342* (2013.01); *F16J 15/3452* (2013.01); *F16J 15/3464* (2013.01)
(58) Field of Classification Search
CPC .... F16J 15/3412; F16J 15/342; F16J 15/3452; F16J 15/3464; F16J 15/3484
See application file for complete search history.

(56) References Cited

U.S. PATENT DOCUMENTS

| 4,290,611 A |   | 9/1981 | Sedy |
|---|---|---|---|
| 4,377,290 A | * | 3/1983 | Netzel ............ F16J 15/3484 |
|   |   |   | 277/374 |

(Continued)

FOREIGN PATENT DOCUMENTS

JP    2012097761 A    5/2012

OTHER PUBLICATIONS

International Search Report issued in PCT/EP2023/050927, mailed Mar. 22, 2023.

*Primary Examiner* — Nicholas L Foster
(74) *Attorney, Agent, or Firm* — Troutman Pepper Locke LLP; Scott D. Wofsy; Gabrielle L. Gelozin

(57) ABSTRACT

The invention relates to a mechanical seal arrangement for sealing a process chamber (6), which is filled with a non-toxic, gaseous process medium, with respect to a bearing chamber (8), comprising a first mechanical seal (2) with a rotating slide ring (20) having a first sliding surface (20a) and a stationary slide ring (21) having a second sliding surface (21a), which define a first sealing gap (22) between the sliding surfaces (20a, 21a), a second mechanical seal (3) with a rotating slide ring (30) having a third sliding surface (30a) and a stationary slide ring (31) having a fourth sliding surface (31a), which define a second sealing gap (32) between the sliding surfaces (30a, 31a), a first pretensioning device (4) which prestresses the stationary slide ring (21) of the first mechanical seal (2) in the axial direction (X-X) and a second pretensioning device (5) which prestresses the stationary slide ring (31) of the second mechanical seal (3) in the axial direction (X-X), a fluid chamber (7) arranged between the first mechanical seal (2) and the second mechanical seal (3), which is in fluid connection with the first and second sealing gap and, in operation, receives leakage from the process chamber (6) via the first sealing gap (22), and from which a return line (9) leads off, (Continued)

Figure 1:
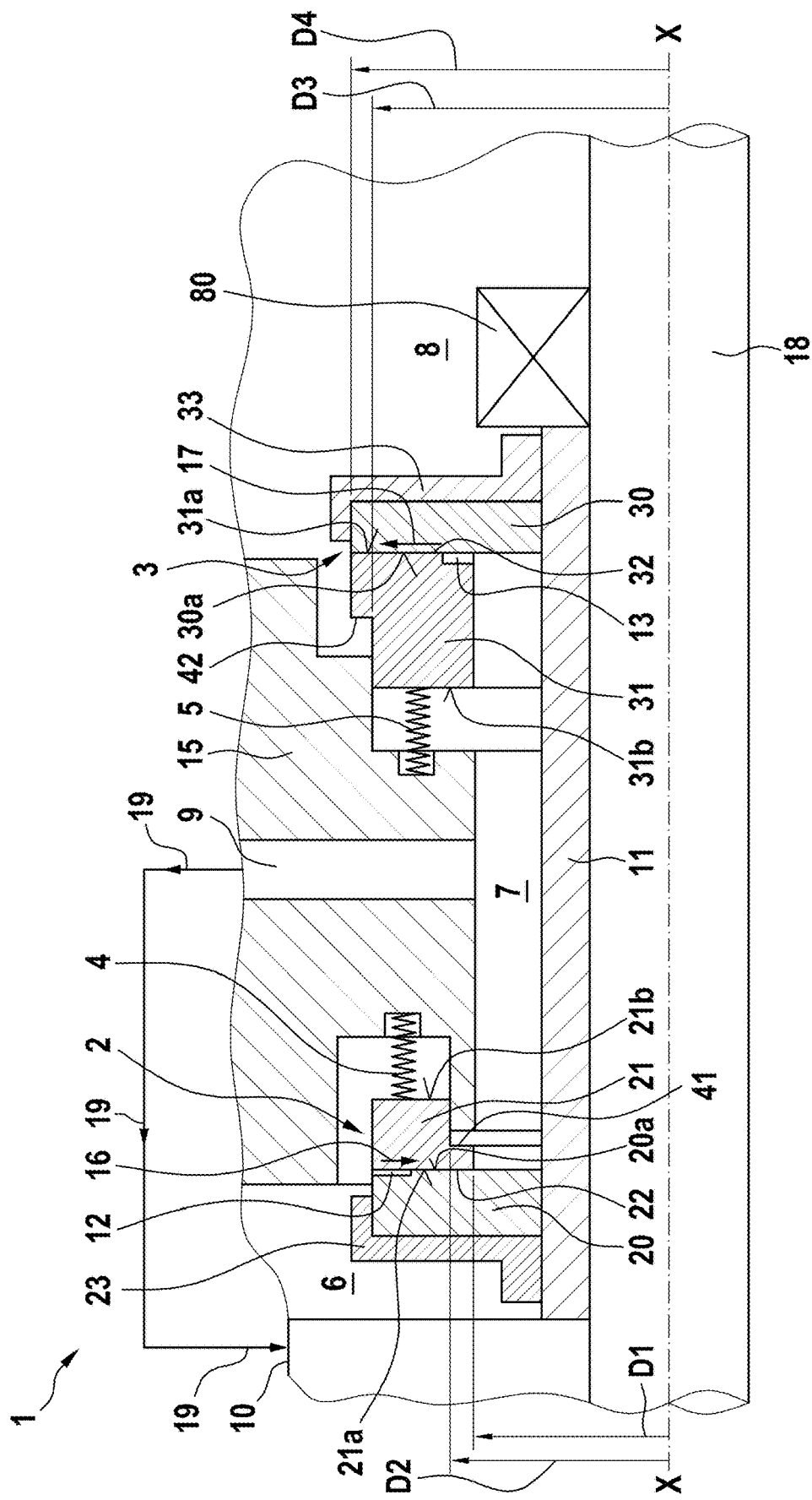

configured for a return of process medium from the fluid chamber (7) to a process area.

11 Claims, 3 Drawing Sheets

(56) References Cited

U.S. PATENT DOCUMENTS

| | | | | |
|---|---|---|---|---|
| 4,669,738 | A | * | 6/1987 | Netzel ................. F16J 15/3484 277/374 |
| 5,454,572 | A | | 10/1995 | Pospisil |
| 5,498,007 | A | | 3/1996 | Kulkarni et al. |
| 5,938,205 | A | * | 8/1999 | Azibert ................. F16J 15/3404 277/408 |
| 11,879,549 | B2 | * | 1/2024 | Ishijima ................. F16L 39/06 |
| 2003/0122313 | A1 | * | 7/2003 | Takahashi ............ F16J 15/3484 277/358 |
| 2003/0178780 | A1 | * | 9/2003 | Takahashi ............ F16J 15/3484 277/370 |
| 2009/0134583 | A1 | * | 5/2009 | Droscher ............ F16J 15/3484 277/369 |
| 2014/0232069 | A1 | * | 8/2014 | Jacobs ................. F16J 15/3448 277/365 |
| 2019/0107236 | A1 | | 4/2019 | Petrou et al. |
| 2022/0205541 | A1 | * | 6/2022 | Ishijima ................. F16C 33/72 |

\* cited by examiner

MECHANICAL SEAL ARRANGEMENT

CROSS-REFERENCE TO RELATED APPLICATIONS

This application is a U.S. National Phase Application filed under 35 U.S.C. § 371, based on International Patent Application No. PCT/EP2023/050927, filed Jan. 17, 2023, which claims priority to German Patent Application No. 10 2022 102 776.7, filed on Feb. 7, 2022, which are incorporated herein by reference.

The invention relates to a gas-lubricated mechanical seal arrangement for sealing process chamber, which is filled with a non-toxic gaseous medium, with respect to a bearing chamber, in which a bearing is arranged for supporting a shaft, as well as to a compressor arrangement.

Mechanical seal arrangements are known from the prior art in various designs. The so-called tandem design, in which two mechanical seals are arranged in series on a shaft and a barrier gas is fed into an intermediate space between the two mechanical seals, has proven itself for sealing gaseous media. The barrier gas is provided by means of a barrier gas device which, in addition to the additional structural effort, also has continuous operating costs during operation due to the generation of the barrier gas, which must be supplied under a predetermined pressure. For example, DE 10 2018 208 519 A1 shows a gas-lubricated mechanical seal arrangement with a barrier gas device that uses nitrogen as the barrier gas. Recently, however, there has been an increasing demand for applications in which media that are non-toxic to the environment, such as carbon dioxide or nitrogen, need to be sealed, with a particular focus on the compression of carbon dioxide in order to remove it from the ambient air to reduce the greenhouse effect and compress it for storage in reservoirs, for example.

It is therefore the object of the present invention to provide a mechanical seal arrangement which enables the sealing of gaseous media which are non-toxic to the environment, in particular $CO_2$ or nitrogen, with a simple structure and simple, low-cost manufacturability, as well as a compressor arrangement.

This object is achieved by a mechanical seal arrangement having the features of claim 1 and a compressor arrangement having the features of claim 10. The dependent claims specify preferred embodiments of the invention.

The gas-lubricated mechanical seal arrangement according to the invention for sealing a process chamber filled with a gaseous, non-toxic medium with respect to a bearing chamber and having the features of claim 1 provides the advantage that a particularly cost-effective and reliable sealing of the process chamber with respect to a bearing chamber, in which ambient pressure prevails, is possible. No costly, separate barrier gas device needs to be provided in order to enable sealing on a rotating component, in particular a shaft. The mechanical seal arrangement according to the invention can therefore be provided at a particularly low cost. This is achieved in accordance with the invention in that the mechanical seal arrangement comprises a first mechanical seal and a second mechanical seal. The first mechanical seal comprises a rotating and a stationary slide ring, which define a first sealing gap between their sliding surfaces. The second mechanical seal comprises a rotating and a stationary slide ring, which define a second sealing gap between their sliding surfaces. Furthermore, the mechanical seal arrangement comprises a first and a second pretensioning device. The first pretensioning device prestresses the stationary slide ring of the first mechanical seal and the second pretensioning device prestresses the stationary slide ring of the second mechanical seal. A fluid chamber is arranged between the first and second mechanical seal, from which a return line in a housing leads off, which is configured to return the gaseous, non-toxic medium to the process area. The fluid chamber is in fluid connection with the first and second sealing gap and, during operation, receives leakage from the process chamber which escapes via the first sealing gap. The first and second mechanical seals are arranged in series in such a way that a rear side of the stationary slide ring of the first mechanical seal and a rear side of the stationary slide ring of the second mechanical seal are aligned in opposite directions. Furthermore, a first step is formed on the inner circumference of the stationary slide ring of the first mechanical seal. A minimum first inner diameter D1 of the stationary slide ring of the first mechanical seal is smaller than a maximum second inner diameter D2 of the stationary slide ring of the first mechanical seal. In a non-operating state of the mechanical seal, the first sealing gap of the first mechanical seal is open so that process gas can flow from the process chamber via the open sealing gap into the fluid chamber between the first and second mechanical seal. Furthermore, a second step is formed on the outer circumference of the stationary slide ring of the second mechanical seal. A minimum first outer diameter D3 of the stationary slide ring of the second mechanical seal is smaller than a maximum second outer diameter D4 of the stationary slide ring of the second mechanical seal. In the non-operating state of the mechanical seal arrangement, the second sealing gap of the second mechanical seal is closed or has very little leakage. Furthermore, a first leakage direction in the first sealing gap of the first mechanical seal extends from the outside from the process chamber inwards to the fluid chamber and a second leakage direction in the second sealing gap of the second mechanical seal extends from the inside from the fluid chamber outwards to the bearing chamber.

Thus, when the mechanical seal arrangement is in the non-operating state, in which the rotating component on which the mechanical seal arrangement seals is not rotating, the first sealing gap of the first mechanical seal is open and the second sealing gap of the second mechanical seal is closed. The leaking process medium is returned to the process chamber via the return line from the fluid chamber. In the non-rotating state of the mechanical seal arrangement, the second mechanical seal seals the fluid chamber with respect to the bearing chamber. In the state in which the rotatable component to be sealed rotates, both mechanical seals are in the activated state. There is a first small leakage from the process chamber into the fluid chamber via the first sealing gap and a second small leakage from the fluid chamber via the second sealing gap of the second mechanical seal to the bearing chamber. As a result, no separate barrier medium is required for the operation of the two mechanical seals; instead, the first and second mechanical seals are lubricated by means of the process medium. A large part of the leakage via the first sealing gap of the first mechanical seal is returned to the process area via the return line and is therefore not lost. According to the invention, the term gaseous, non-toxic medium is understood to mean a medium in the gaseous aggregate state or in the supercritical state.

The mechanical seal arrangement according to the invention also exhibits very good sealing performance even at high speeds, for example when used on a compressor shaft. Due to the arrangement of the return line from the fluid chamber, which is located between the first and second mechanical seal, to the process area, a large part of the first leakage can also be recovered via the first sealing gap and returned to the process. During operation, the only remaining leakage is then the second leakage via the second sealing gap of the second mechanical seal, which is, however, relatively small.

According to a preferred embodiment of the invention, the rotating slide ring of the first mechanical seal comprises a plurality of first conveying grooves on the sliding surface. The first conveying grooves are preferably arranged on the outer circumference of the rotating slide ring of the first mechanical seal and preferably extend inwards in a crescent shape.

Further preferably, the stationary slide ring of the second mechanical seal comprises second conveying grooves. Preferably, the second conveying grooves are arranged to extend outwards on the inner circumference and, in particular, extend outwards in a crescent shape from the inner circumference of the stationary slide ring of the second mechanical seal.

Conveying grooves are preferably provided on all slide rings of the first and second mechanical seal.

Preferably, a first differential pressure between the process chamber and the fluid chamber is at least three times as high as a second differential pressure between the fluid chamber and the bearing chamber. Preferably, the first differential pressure is at least five times as high, in particular at least ten times as high, as the second differential pressure at the second mechanical seal.

Further preferably, during operation, an amount of the first leakage via the first sealing gap of the first mechanical seal is at least twice as large as an amount of the second leakage via the second sealing gap of the second mechanical seal.

Preferably, the first and second mechanical seal are arranged on a common sleeve.

The process medium is preferably carbon dioxide or nitrogen. Alternatively, the process medium is a refrigerant, for example R134a or R245fa.

Further preferably, the first inner diameter D1 of the stationary slide ring of the first mechanical seal is in a range defined by the following inequality:

0.8×D2≤D1<D2, where D2 is the maximum second inner diameter, and in particular D1 is in the range of 0.9D2≤D1<D2.

This means that the first inner diameter D1 is in a range that is a maximum of 20% smaller than the second inner diameter D2 of the stationary slide ring.

Further preferably, the first outer diameter D3 of the stationary slide ring of the second mechanical seal is in a range defined by the following inequality:

0.8×D4≤D3<D4, where D4 is the maximum second outer diameter, and in particular D3 is in the range of 0.9×D4≤D3<D4.

This means that the first outer diameter D3 is in a range between 80% of the second outer diameter D4 of the second mechanical seal up to the outer diameter D4. In particular, this allows the closing forces acting on the second mechanical seal to be adapted.

Furthermore, the present invention relates to a compressor arrangement for compressing a gaseous medium with a compressor and a mechanical seal arrangement according to the invention.

Figure 2:
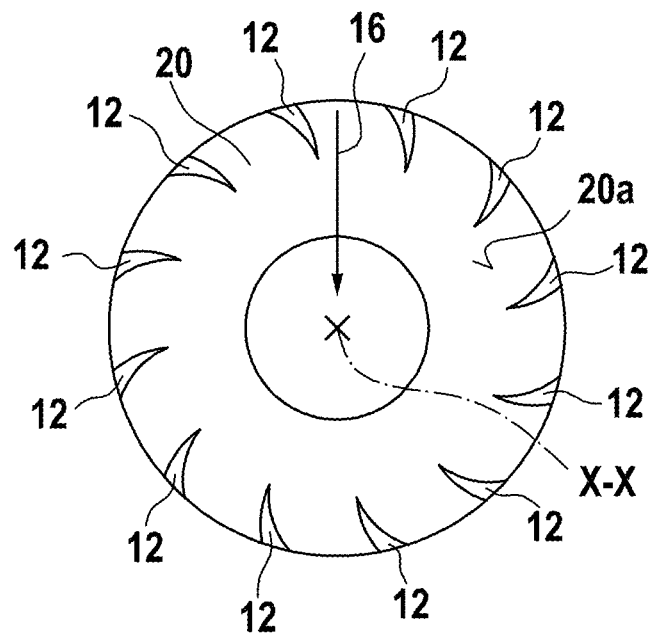
Figure 3:
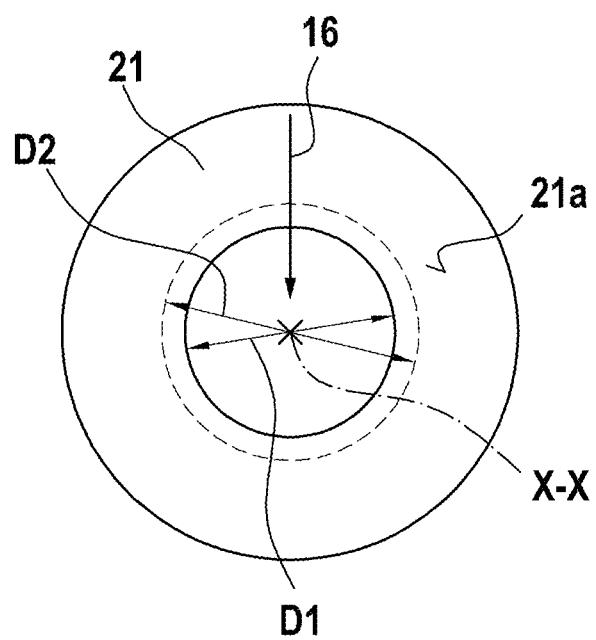
Figure 4:
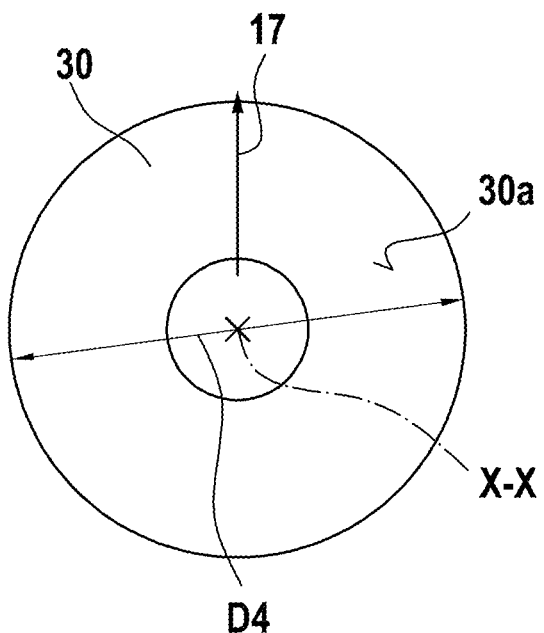
Figure 5:
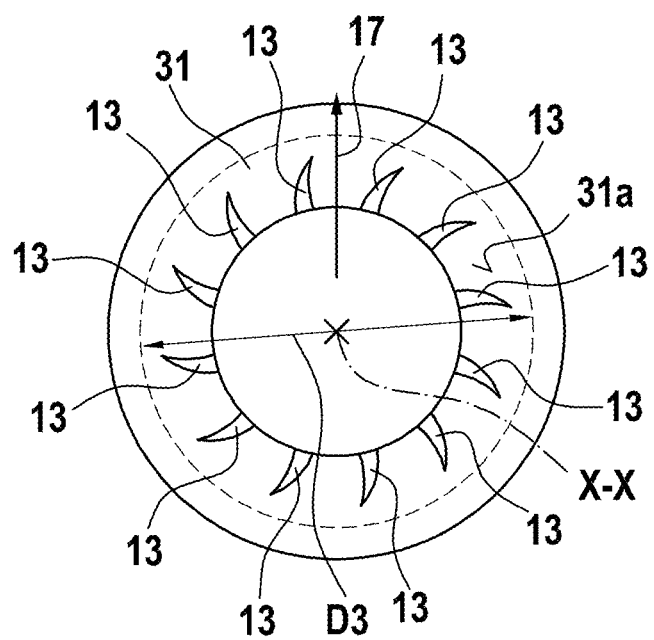

In the following, a preferred embodiment of the invention is described in detail with reference to the accompanying drawing. The drawing shows:

FIG. 1 schematic sectional view of a mechanical seal arrangement according to a preferred embodiment of the invention, FIG. 2 schematic top view of a sliding surface of a rotating slide ring of a first mechanical seal, FIG. 3 schematic top view of a sliding surface of a stationary slide ring of the first mechanical seal, FIG. 4 schematic top view of a sliding surface of a rotating slide ring of a second mechanical seal and FIG. 5 schematic top view of a sliding surface of a stationary slide ring of the second mechanical seal.

Referring to FIGS. 1 to 5, a mechanical seal arrangement 1 according to a preferred embodiment of the invention is described in detail below.

The mechanical seal arrangement 1 seals a process chamber 6 with respect to a bearing chamber 8. A bearing 80, on which a shaft 18 is supported, is arranged in the bearing chamber 8.

The mechanical seal arrangement 1 comprises two mechanical seals, i.e. a first mechanical seal 2 and a second mechanical seal 3. The two mechanical seals 2, 3 are arranged in series to seal the process chamber 6 with respect to the bearing chamber 8. This is a so-called double seal.

A gaseous medium that is non-toxic to the environment, such as carbon dioxide ($CO_2$) or nitrogen, is present in the process chamber 6.

The first mechanical seal 2 comprises a rotating slide ring 20 having a first sliding surface 20a and a stationary slide ring 21 having a second sliding surface 21a. A first sealing gap 22 is defined between the two sliding surfaces 20a, 21a. The rotating slide ring 20 is set in rotation by means of a first driver element 23.

The second mechanical seal 3 comprises a rotating slide ring 30 having a third sliding surface 30a and a stationary slide ring 31 having a fourth sliding surface 31a. A second sealing gap 32 is defined between the two slide surfaces 30a, 31a. The rotating slide ring 30 of the second mechanical seal 3 is set in rotation by means of a second driver element 33.

The first mechanical seal 2 and the second mechanical seal 3 are arranged on a common sleeve 11, which is fixed to the shaft 18. The mechanical seals are configured without through-holes.

As can also be seen from FIG. 1, the arrangement of the first mechanical seal 2 and the second mechanical seal 3 is such that a rear side 21b of the stationary slide ring 21 of the first mechanical seal 2 is directed towards a rear side 31b of the stationary slide ring 31 of the second mechanical seal 3. The stationary slide ring 21 of the first mechanical seal 2 and the stationary slide ring 31 of the second mechanical seal 3 are fixed on a housing 15.

The stationary slide ring 21 of the first mechanical seal 2 is prestressed in the axial direction X-X of the mechanical seal arrangement 1 by means of a first pretensioning device 4. The stationary slide ring 31 of the second mechanical seal 3 is prestressed in the axial direction X-X by means of a second pretensioning device 5. In this exemplary embodiment, the pretensioning devices are several cylinder springs, which are arranged along the circumference on the rear sides of the stationary slide rings 21, 31.

As can also be seen in FIG. 1, a fluid chamber 7 is formed between the first mechanical seal 2 and the second mechanical seal 3. A return line 9 leads from the fluid chamber 7 back to a compressor 10, which is indicated schematically in FIG. 1. Fluid can thus be fed back to the compressor 10 in the direction of the process area via the return line 9.

As can be seen in FIGS. 2 and 3, a large number of first conveying grooves 12 are provided in the rotating slide ring 20 of the first mechanical seal 2. The first conveying grooves 12 extend from an outer circumference of the rotating slide ring 20 inwards in a crescent shape. No grooves are formed in the sliding surface 21a of the stationary slide ring 21.

As can also be seen in FIGS. 4 and 5, no conveying grooves are formed in the rotating slide ring 30 of the second mechanical seal 3. However, second conveying grooves 13 are formed in the stationary slide ring 31. The second conveying grooves 13 extend outwards from an inner circumference of the stationary slide ring 31 in a crescent shape.

Thus, in the first mechanical seal 2, a conveying direction across the first sealing gap 22 is from radially outwards to radially inwards. This is indicated in FIG. 1 by a first leakage direction 16 (arrow). In the second mechanical seal 3, a second leakage direction 17 is from radially inwards to radially outwards, as a conveying direction in a radial outwards direction is defined by the second conveying grooves 13.

As can also be seen from FIG. 1, the stationary slide ring 21 of the first mechanical seal comprises a first step 41 on the inner circumference. A minimum first inner diameter D1 of the stationary slide ring 21 of the first mechanical seal 2 is smaller than a maximum second inner diameter D2 of the stationary slide ring 21 of the first mechanical seal 2. This ensures that when the shaft 18 is not rotating, i.e. when the compressor 10 is not in operation, the first sealing gap 22 remains open.

In the second mechanical seal 3, a second step 42 is formed on the outer circumference of the stationary slide ring 31 of the second mechanical seal 3. A minimum first outer diameter D3 of the stationary slide ring 31 is smaller than a maximum second outer diameter D4 of the stationary slide ring 31 of the second mechanical seal 3. Using the spring force of the second pretensioning device 5, it is ensured that the second sealing gap 32 is closed or almost closed when the compressor 10 is at a standstill, i.e. when the shaft 18 is not rotating. In other words, the two sliding surfaces 30a, 31a are in contact with each other and seal the second mechanical seal 3 completely or almost completely, so that no or little fluid can flow out of the fluid chamber 7 in the direction of the bearing chamber 8.

During operation of the mechanical seal arrangement 1 when the shaft 18 rotates, there is thus leakage from the process chamber 6 into the fluid chamber 7 and from the fluid chamber 7 into the bearing chamber 8 via the first sealing gap 23. As can be seen from FIG. 1, the flow directions via the first sealing gap 22 and the second sealing gap 32 are opposite in the radial direction. In other words, the direction of flow through the first sealing gap 22 is radially inwards (arrow 16), while the direction of flow in the second sealing gap 32 is radially outwards during operation (arrow 17).

The first and second mechanical seals 2 and 3 thus seal in the usual manner during operation of the compressor 10, although the leakage amounts via the sealing gaps of the first and second mechanical seals 2 and 3 are different. The leakage amount via the first sealing gap 22 of the first mechanical seal 2 is much greater than the leakage amount via the second sealing gap 32 of the second mechanical seal 3. Furthermore, leakage that enters the fluid chamber 7 from the process chamber 6 via the first sealing gap 22 is returned to the compressor 10 via the return line 9. The arrows 19 in FIG. 1 illustrate the direction of return flow from the fluid chamber 7 towards the process area to the compressor 10. This means that a large amount of the leakage can be recovered via the first mechanical seal 2 and reintroduced into the compressor 10 at the appropriate point, which corresponds to the pressure level of the returned gaseous process medium. The leakage escaping from the fluid chamber 7 into the bearing chamber 8 via the second sealing gap 32 of the second mechanical seal 3 can be released into the environment without any problems, as the process medium is a non-toxic gas for the environment.

Thus, the mechanical seal arrangement 1 according to the invention also uses the process medium as a barrier medium for the first and second mechanical seal 2, 3. This means that no separate barrier fluid device, which is usually present in mechanical seals, has to be provided in order to provide the barrier medium for the mechanical seals. This significantly reduces the costs of the mechanical seal arrangement 1.

The invention thus provides a self-supplying bearing seal that seals the process chamber 6 from the bearing chamber 8. During operation of the mechanical seal arrangement 1, the process medium thus provides the barrier fluid in both mechanical seals 2, 3. When the mechanical seal arrangement 1 is non-operating, the first sealing gap 22 of the first mechanical seal 2 is open and the second sealing gap 32 of the second mechanical seal 3 is closed or essentially closed by the spring forces of the second pretensioning device 5 and the difference in diameter between the first outer diameter D3 and the second outer diameter D4 on the stationary mechanical slide ring 31. This prevents the process medium that has entered the fluid chamber 7 as a leakage via the first sealing gap 22 from escaping into the bearing chamber 8, or only a minimal leakage from the fluid chamber 7 in the direction of the bearing chamber 8 occurs.

The second leakage direction 17 of the second mechanical seal 3 from radially inwards to radially outwards also prevents oil from the bearing chamber 8, which is necessary for lubricating the bearing 80, from entering the fluid chamber 7.

The present invention thus provides a very cost-effective mechanical seal arrangement 1 for sealing bearings, in which a supply unit for supplying the barrier medium can be completely dispensed with. The process medium to be sealed is used as the barrier medium in both mechanical seals. Leakage of the process medium during operation via the second sealing gap 32 is not critical, as the process medium can be a gas that is non-toxic to the environment, such as carbon dioxide or nitrogen, or a refrigerant such as R134a or R245.

The back-to-back arrangement of the two rear sides 21b, 31b of the two stationary slide rings 21, 31 also allows a particularly compact design to be realized. The return line 19 extends between the first and second mechanical seal 2, 3 (see FIG. 1). Furthermore, the mechanical seal arrangement 1 according to the invention does not require any additional labyrinth seals or lip seals or the like. It is also possible to design all slide rings of the first and second mechanical seal 2, 3 without a through bore or the like. This can achieve a major cost advantage, particularly in the manufacture of the mechanical seals 2, 3.

In addition to the above written description of the invention, explicit reference is hereby made to the graphic representation of the invention in FIGS. 1 to 5 for its supplementary disclosure.

LIST OF REFERENCE NUMERALS 1 mechanical seal arrangement
2 first mechanical seal
3 second mechanical seal
4 first pretensioning device 5 second pretensioning device
6 process chamber
7 fluid chamber
8 bearing chamber
9 return line
10 compressor
11 sleeve
12 first conveying grooves
13 second conveying grooves
15 housing
16 first leakage direction
17 second leakage direction
18 shaft
19 return flow direction
20 rotating slide ring
20a first sliding surface
21 stationary slide ring
21a second sliding surface
21b rear side of the stationary slide ring 21
22 first sealing gap
23 first driver element
30 rotating slide ring
30a additional sliding surface
31 stationary slide ring
31a stationary sliding surface
31b rear side of the stationary slide ring 31
32 second sealing gap
33 second driver element
41 first step
42 second step
80 bearing
D1 minimum first inner diameter of the stationary slide ring 21
D2 maximum second inner diameter of the stationary slide ring 21
D3 minimum first outer diameter of the stationary slide ring 31
D4 maximum second outer diameter of the stationary slide ring 31
X-X axial direction

The invention claimed is:

1. A mechanical seal arrangement for sealing a process chamber, which is filled with a non-toxic gaseous process medium, with respect to a bearing chamber, comprising:
a first mechanical seal with a rotating slide ring having a first sliding surface and a stationary slide ring having a second sliding surface, which define a first sealing gap between the sliding surfaces;
a second mechanical seal with a rotating slide ring having a third sliding surface and a stationary slide ring having a fourth sliding surface, which define a second sealing gap between the sliding surfaces;
a first pretensioning device which prestresses the stationary slide ring of the first mechanical seal in the axial direction (X-X);
a second pretensioning device which prestresses the stationary slide ring of the second mechanical seal in the axial direction (X-X);
a fluid chamber arranged between the first mechanical seal and the second mechanical seal, which is in fluid connection with the first and second sealing gap and, during operation, receives leakage from the process chamber via the first sealing gap, and from which a return line leads off, configured for a return of process medium from the fluid chamber to a process area;
wherein the first mechanical seal and the second mechanical seal are arranged such that a rear side of the stationary slide ring of the first mechanical seal and a rear side of the stationary slide ring of the second mechanical seal face each other,
wherein the stationary slide ring of the first mechanical seal comprises a first step on the inner circumference such that a minimum first inner diameter D1 of the stationary slide ring of the first mechanical seal is smaller than a maximum second inner diameter D2 of the stationary slide ring of the first mechanical seal,
wherein the stationary slide ring of the second mechanical seal comprises a second step on the outer circumference such that a minimum first outer diameter D3 of the stationary slide ring of the second mechanical seal is smaller than a maximum second outer diameter D4 of the stationary slide ring of the second mechanical seal,
wherein the first sealing gap of the first mechanical seal is open in a non-operating state of the mechanical seal arrangement, so that the process medium can flow from the process chamber into the fluid chamber via the open first sealing gap,
and wherein the second sealing gap of the second mechanical seal is closed,
and wherein a first leakage direction in the first sealing gap extends from the outside from the process chamber inwards to the fluid chamber and a second leakage direction in the second sealing gap extends from the inside from the fluid chamber outwards to the bearing chamber.

2. The mechanical seal arrangement according to claim 1, wherein the rotating slide ring of the first mechanical seal comprises first conveying grooves.

3. The mechanical seal arrangement according to claim 2, wherein the first conveying grooves extend inwards from an outer circumference of the rotating slide ring of the first mechanical seal.

4. The mechanical seal arrangement according to claim 1, wherein the stationary slide ring of the second mechanical seal comprises second conveying grooves.

5. The mechanical seal arrangement according to claim 4, wherein the second conveying grooves extend outwards from an inner circumference of the stationary slide ring of the second mechanical seal.

6. The mechanical seal arrangement according to claim 1, wherein the mechanical seal arrangement is configured such that a first differential pressure between the process chamber and the fluid chamber is at least three times as high as a second differential pressure between the fluid chamber and the bearing chamber.

7. The mechanical seal arrangement according to claim 1, wherein the mechanical seal arrangement is configured such that a leakage amount of the process medium via the first sealing gap of the first mechanical seal is at least twice as large as a leakage amount of the process medium from the fluid chamber via the second sealing gap of the second mechanical seal to the bearing chamber.

8. The mechanical seal arrangement according to claim 1, wherein the first mechanical seal and the second mechanical seal are arranged on a common sleeve.

9. The mechanical seal arrangement according to claim 1, wherein the mechanical seal arrangement is configured such that carbon dioxide, nitrogen, or a refrigerant is present as gaseous process medium in the process chamber and the mechanical seal arrangement is arranged to seal the process chamber with respect to the bearing chamber.

10. The mechanical seal arrangement according to claim 1, wherein the minimum first inner diameter D1 of the stationary slide ring of the first mechanical seal is in a range of $0.8 \times D2 \leq D1 < D2$, and/or wherein the maximum first outer diameter $D3$ of the stationary slide ring of the second mechanical seal is in a range of $0.8 \times D4 \leq D3 < D4$.

11. A compressor arrangement for compressing a gaseous process medium, comprising a compressor and a mechanical seal arrangement according to claim 1, in order to seal a process chamber with respect to a bearing chamber with a bearing which supports a shaft of the compressor.

\* \* \* \* \*